US009013395B2

(12) United States Patent
Lee

(10) Patent No.: US 9,013,395 B2
(45) Date of Patent: Apr. 21, 2015

(54) MINIMIZING POWER CONSUMPTION IN AN ELECTROPHORETIC DISPLAY BY DISCHARGING ALL THE GATE LINES DURING THE INTERVAL BETWEEN THE OUTPUT OF CONSECUTIVE GATE PULSES OF AN IMAGE UPDATE PERIOD

(75) Inventor: Sunghoon Lee, Gumi-si (KR)

(73) Assignee: LG Display Co., Ltd., Seoul (JP)

( * ) Notice: Subject to any disclaimer, the term of this patent is extended or adjusted under 35 U.S.C. 154(b) by 367 days.

(21) Appl. No.: 13/403,868

(22) Filed: Feb. 23, 2012

(65) Prior Publication Data

US 2013/0127814 A1 May 23, 2013

(30) Foreign Application Priority Data

Nov. 23, 2011 (KR) ........................ 10-2011-0123146

(51) Int. Cl.

*G09G 3/34* (2006.01)
*G09G 5/00* (2006.01)
*G06F 3/038* (2013.01)

(52) U.S. Cl.

CPC ........ *G09G 3/344* (2013.01); *G09G 2310/0267* (2013.01); *G09G 2310/068* (2013.01); *G09G 2330/022* (2013.01); *G09G 2330/028* (2013.01); *G09G 2310/0264* (2013.01)

(58) Field of Classification Search

CPC ...... G02F 1/167; G09G 3/344; G09G 3/3433; G09G 3/3446; G09G 3/3629–3/364; G09G 3/3651; G09G 2330/021; G09G 2330/022; G09G 2310/0267

USPC ..................................... 345/97, 107; 359/296

See application file for complete search history.

(56) References Cited

U.S. PATENT DOCUMENTS

| | | | | |
|---|---|---|---|---|
| 5,606,343 | A * | 2/1997 | Tsuboyama et al. | 345/97 |
| 2005/0024353 | A1* | 2/2005 | Amundson et al. | 345/204 |
| 2008/0150887 | A1* | 6/2008 | Kim et al. | 345/107 |
| 2008/0224992 | A1* | 9/2008 | Kim et al. | 345/107 |
| 2010/0214279 | A1* | 8/2010 | Kim et al. | 345/213 |
| 2010/0238106 | A1* | 9/2010 | Chang et al. | 345/107 |
| 2010/0277453 | A1* | 11/2010 | Wang et al. | 345/211 |
| 2011/0141074 | A1* | 6/2011 | Koo | 345/205 |
| 2012/0113082 | A1* | 5/2012 | Lee | 345/211 |

FOREIGN PATENT DOCUMENTS

CN 101206838 A 6/2008

OTHER PUBLICATIONS

State Intellectual Property Office of the People's Republic of China, First Office Action, Chinese Patent Application No. 201210327741.1, Sep. 28, 2014, eight pages.

* cited by examiner

*Primary Examiner* — Chanh Nguyen
*Assistant Examiner* — Navin Lingaraju
(74) *Attorney, Agent, or Firm* — Fenwick & West LLP

(57) ABSTRACT

An electrophoresis display device that reduces power consumption of the device. The electrophoresis display device reduces power consumption by stopping the output of driving circuits that drive a display panel during a stabilization period following an image update period of the device.

17 Claims, 5 Drawing Sheets

MINIMIZING POWER CONSUMPTION IN AN ELECTROPHORETIC DISPLAY BY DISCHARGING ALL THE GATE LINES DURING THE INTERVAL BETWEEN THE OUTPUT OF CONSECUTIVE GATE PULSES OF AN IMAGE UPDATE PERIOD

CROSS REFERENCE TO RELATED APPLICATIONS

This application claims the benefit under 35 U.S.C. 119(a) of Korea Patent Application No. 10-2011-0123146, filed on Nov. 23, 2011, which is incorporated herein by reference in its entirety.

BACKGROUND

1. Technical Field

The embodiments disclosed herein generally relate to an electrophoresis display device and a method for controlling a stabilization period of the device.

2. Discussion of the Related Art

Electrophoresis describes the motion of electrically charged particles (i.e. a material) when under the influence of an electric field. The particles may move in accordance with their electric charge and in accordance with the size and shape of the particles. Recently, display devices using electrophoresis have been developed and are an alternative to conventional paper mediums or conventional displays.

An electrophoresis display device comprises data lines, gate lines (or scan lines) intersecting the data lines, and an electrophoretic film. Since electrophoresis display devices have a memory effect, power is consumed temporarily when a display panel for updating images is driven, and subsequent power consumption is little.

The driving circuits of electrophoresis display devices may malfunction if input signals to the driving circuits are cut off (i.e., stopped) after an image update period has elapsed. The image update period is a time period for updating the display panel with new image data. To address the malfunction, a stabilization period may be used in the electrophoresis display device to stabilize the operation of the driving circuits. The operation of the driving circuits is stabilized by maintaining the signals that are input to the driving circuits after the image update period has elapsed. However, power consumption is generated because the driving circuits generate output signals during the stabilization period, and these unwanted outputs may cause a negative effect on the images displayed on the display panel.

SUMMARY

The embodiments disclosed herein provide an electrophoresis display device which reduces power consumption by stopping the output of driving circuits that drive a display panel during a stabilization period following an image update period.

According to an embodiment, an electrophoresis display device comprises a display panel comprising data lines and gate lines intersecting the data lines, and a data driving circuit configured to convert digital data into data voltages that are supplied to the data lines in response to a source timing control signal during an image update period. The electrophoresis display device may also comprise a gate driving circuit that supplies scan (i.e., gate) pulses to the gate lines in synchronization with the data voltages at the data lines in response to a gate timing control signal during an image update period. The electrophoresis display device may also comprise a gate discharge transistor that periodically discharges output channels of the gate driving circuit during the image update period in response to a power consumption shutoff control signal. The gate discharge transistor continuously discharges the output channels of the gate driving circuit during the stabilization period that is set subsequent to the image update period in response to the power consumption shutoff control signal. The electrophoresis display device may further comprise a controller that transmits digital video data to the data driving circuit and generates the source timing control signal, the gate timing control signal, and the power consumption shutoff control signal during the stabilization period.

The electrophoresis display device further comprises a floating source transistor that periodically connects the output channels of the data driving circuit to the data lines during the image update period in response to the power consumption shutoff control signal. The floating source transistor causes the output channels of the data driving circuits to continuously float (i.e., disconnect) during the stabilization period in response to the power consumption shutoff control signal.

The power consumption shutoff control signal is generated as a pulse signal or line during the image update period. The power consumption shutoff control signal is output at a gate low voltage in synchronization with an output timing of gate pulses. The power consumption shutoff control signal is output at a gate high voltage that is higher than the gate low voltage at a non-output of the gate pulses. The power consumption shutoff control signal maintains the gate high voltage during the stabilization period. In one embodiment, the gate discharge transistor is incorporated in the gate driving circuit and the floating source transistor is incorporated in the data driving circuit.

In one embodiment, a method for controlling a stabilization period of the electrophoresis display device comprises transmitting digital video data to the data driving circuit and generating a source timing control signal, a gate timing control signal, and a power consumption shutoff control signal. The signals are generated during an image update period and during a stabilization period that is set subsequent to the image update period. Output channels of the gate driving circuit are periodically discharged during the image update period in response to the power consumption shutoff control signal. The output channels of the gate driving circuit are also continuously discharged during the stabilization period in response to the power consumption shutoff control signal.

The features and advantages described in this summary and the following detailed description are not intended to be limiting. Many additional features and advantages will be apparent to one of ordinary skill in the art in view of the drawings, specification and claims.

Figure 1:
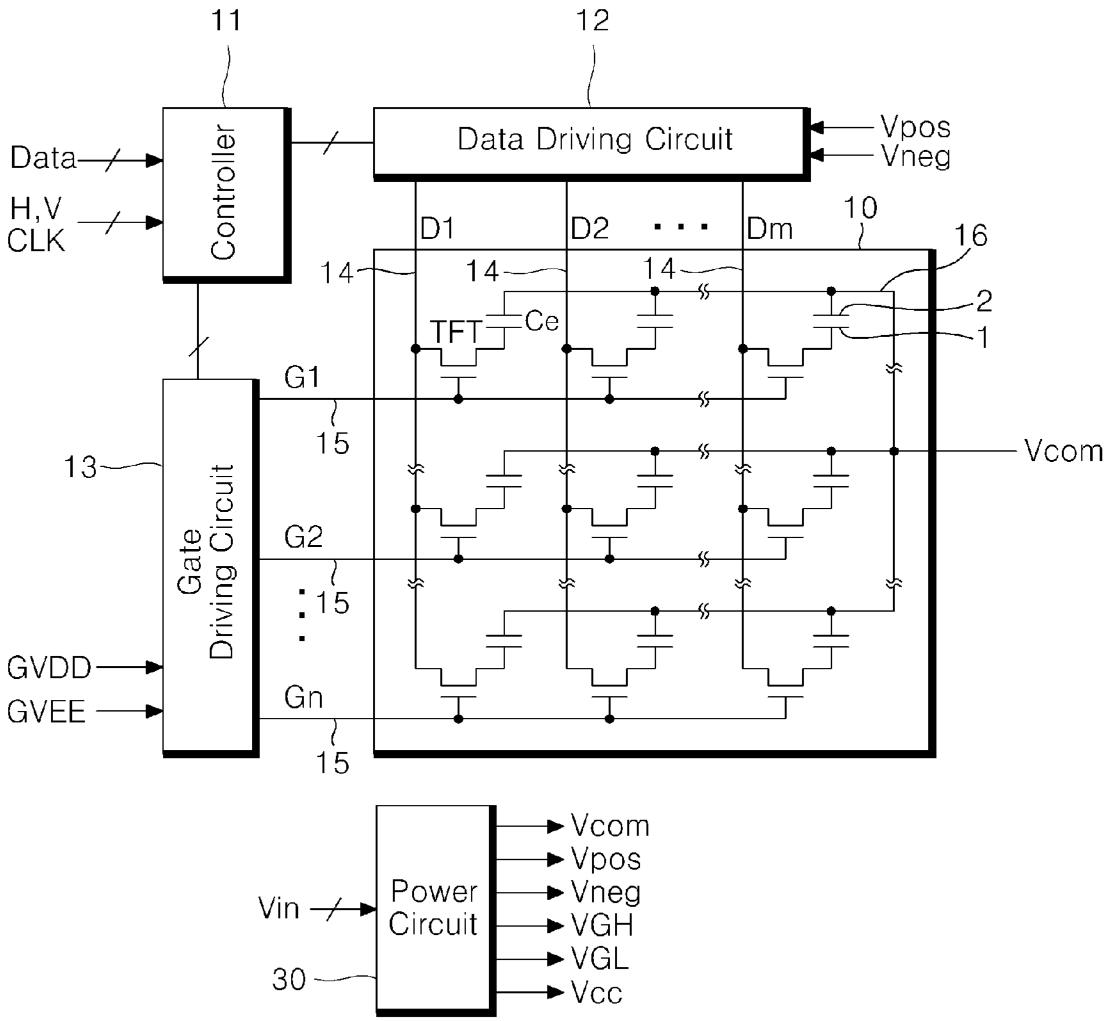
FIG. 1 illustrates a block diagram of an electrophoresis display device according to one embodiment.

The drawings depict, and the detailed description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION OF THE EMBODIMENTS

The embodiments of the invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

FIG. 1 illustrates an electrophoresis display device according to one embodiment. The electrophoresis display apparatus comprises a display panel 10 having m by n pixels Ce arranged in a matrix pattern, a data driving circuit 12 that supplies data voltages to data lines 14 of the display panel 10, a gate driving circuit 13 that supplies scan (i.e., gate) pulses to gate lines 15 of the display panel 10, a controller 11 that controls both the data driving circuit 12 and the gate driving circuit 13. The electrophoresis display device may also include a power circuit 30.

Figure 2:
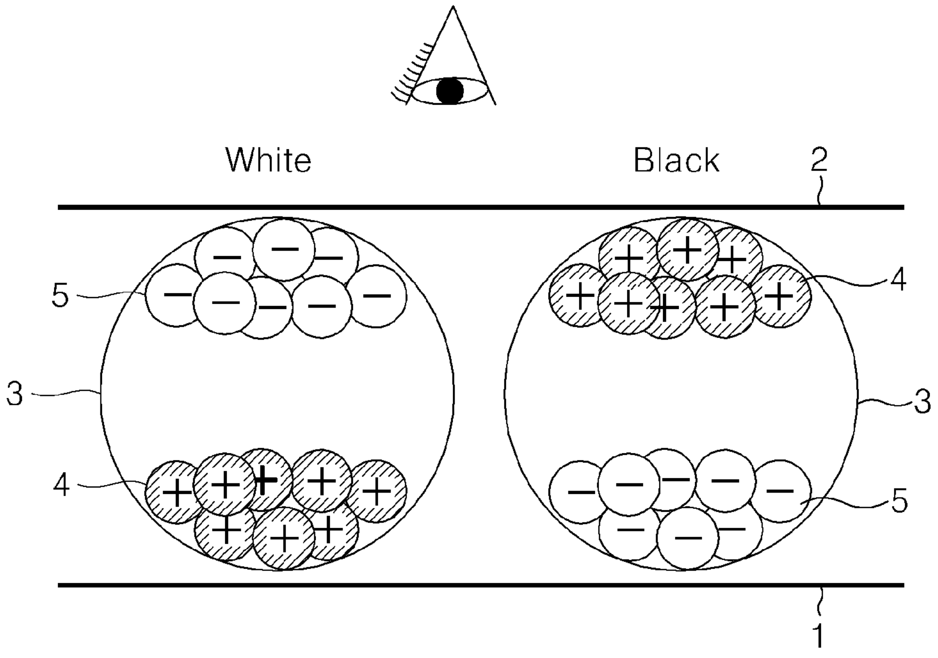
FIG. 2 illustrates a microcapsule structure of a pixel shown in FIG. 1 according to one embodiment.

Each pixel Ce in the display panel 10 comprises a common electrode 2 and a pixel electrode 1. In one embodiment, the common electrode 2 is formed of a transparent material, such as Indium Tin Oxide(ITO). Other materials may be used to for the common electrode 2 in alternative embodiments. Referring now to FIG. 2, FIG. 2 illustrates a structure of a microcapsule structure 3 that is located between the common electrode 2 and the pixel electrode 1 of each pixel Ce. Each microcapsule 3 comprises a plurality of white particles 5 that are negatively charged and a plurality of black particles 4 that are positively charged.

Referring back to FIG. 1, the data lines 14 intersect the gate lines 15 on a lower substrate of the display panel 10. The lower substrate may be formed of glass, metal, or plastic, or other suitable materials. Thin film transistors (TFTs) are provided at intersections of the data lines 14 and gate lines 15. Source electrodes of the TFTs are connected to the data lines 14, and drain electrodes of the TFTs are connected to pixel electrodes 1 of pixels Ce.

When a positive voltage Vpos is applied to a pixel electrode 1 of a pixel Ce, the pixel Ce displays a black grayscale. Referring back to FIG. 2, when a positive voltage Vpos is applied to the pixel electrode 1, the white particles 5 that are negatively charged in the microcapsule 3 are attracted to the positive voltage Vpos at the pixel electrode 1. Conversely, the positive voltage Vpos at the pixel electrode 1 repels the black particles 4 that are positively charged away from the pixel electrode 1. The black particles 4 are repelled and towards the common electrode 2 thus resulting in the pixel Ce displaying a black grayscale.

When a negative data voltage Vneg is applied to the pixel electrode 1 of the pixel Ce, the pixel Ce displays a white grayscale. When a negative voltage Vneg is applied to pixel electrode 1, the black particles 4 that are positively charged in the microcapsule 3 are attracted to the negative voltage Vneg at the pixel electrode 1 as shown in FIG. 2. Conversely, the negative voltage Vneg at the pixel electrode 1 repels the white particles 5 that are negatively charged away from the pixel electrode 1. The white particles 5 are repelled towards the common electrode 2 thus resulting in the pixel Ce displaying a white grayscale.

Thus, during an image update period, new data is written to the pixels Ce. After the image update period has elapsed (i.e., finished), the pixels Ce maintain the grayscales (e.g., black grayscale or white grayscale) of the current data that is written to the pixels Ce until the next update of the device is completed.

As shown in FIG. 1, gate electrodes of the TFTs are connected to the gate lines 15. In response to receiving scan pulses from the gate driving circuit 13 via the gate lines 15, the TFTs are turned on to select a row of pixels Ce to perform display and to supply the data voltages from the corresponding data lines 14 to the pixel electrodes 1 of the selected pixels Ce. A common electrode line 16 is formed on an upper transparent substrate of the display panel 10 to simultaneously supply a common voltage Vcom to all of the pixels Ce. The upper substrate may be formed of glass, plastic, or any other suitable material.

In one embodiment, the data driving circuit 12 comprises a plurality of source drive integrated circuits (ICs) which output one of a positive voltage Vpos, a negative voltage Vneg, and a ground voltage GND. The data driving circuit 12 outputs a positive data voltage Vpos of +15V, for example, when digital data input from the controller 11 is a first value (e.g., '012') during an image update period. The data driving circuit 12 outputs a negative data voltage Vneg of −15V, for example, when digital data input from the controller 11 is a second value (e.g., '102') during an image update period. Also, the data driving circuit 12 outputs a ground voltage GND of 0V when digital data input from the controller 11 is a third value (e.g., '002') or a fourth value (e.g., '112') during an image update period. Therefore, during the duration of an image update period, the data driving circuit 12 selects any one of the three phase voltages Vpos, Vneg, and GND and outputs the selected phase voltage to the data lines 14 in response to digital data input from the controller 11. The voltage output from the data driving circuit 12 is supplied to the pixel electrodes 1 of the pixels Ce via the data lines 14 and the TFTs.

The data driving circuit 12 may not generate an output by causing an output channel connected to the data lines 14 to float in response to a power consumption shutoff control signal (hereinafter, "GMODE signal"). The GMODE signal is received by the data driving circuit 12 from the controller 11 during the stabilization period that is set subsequent to the image update period. In one embodiment, each pixel Ce maintains the data written to it during the stabilization period until the next image update period begins. Therefore, the data driving circuit 12 does not generates an output during the stabilization period even if data and a source timing control signal are input from the controller 11 during the stabilization period.

In one embodiment, the gate driving circuit 13 comprises a shift register, and a level shifter for converting a swing width (i.e., a voltage range) of the voltage of an output signal from the shift register into a swing width suitable to drive the TFTs, etc. The gate driving circuit 13 sequentially outputs scan pulses that are synchronized with data voltages supplied to the data lines 14 during an image update period in order to output the data voltages via the TFTs. The scan pulses swing between a positive gate voltage GVDD and a low gate voltage VGL.

In response to the GMODE signal received from the controller 11, the gate driving circuit 13 connects the output channel connected to the gate lines 15 to a ground voltage source GND or a low voltage source generating the low gate voltage VGL to discharge the output channel during the stabilization period. Accordingly, the gate driving circuit 13 generates no output even if a gate timing control signal is input from the controller 11 during the stabilization period.

The controller 11 receives a horizontal synchronization signal H and a vertical synchronization signal V, and a clock signal CLK to generate control signals for controlling operation timing of the data driving circuit 12 and the gate driving circuit 13. The control signals comprise a source timing control signal for controlling operation timing of the data driving circuit 12 and a gate timing control signal for controlling operation timing of the gate driving circuit 13.

In one embodiment, the source timing signal comprises a source start pulse, a source shift clock, etc. The gate timing signal may comprise a gate start pulse, a gate shift clock, etc. The controller 11 supplies a digital data set for each data grayscale (e.g., for black grayscale and white grayscale) to the data driving circuit 12 according to a current grayscale status of the pixels and the next status of pixels that are going to be updated using a lookup table having waveforms of the data voltages set therein and a frame memory that stores input images.

The controller 11 additionally generates a GMODE signal during the stabilization period that follows the image update period to stop outputs of the gate driving circuit 13 and to stop outputs of the data driving circuit 12 in order to minimize power consumption. During the stabilization period, if no output is generated from the gate driving circuit 13, power consumption can be greatly improved compared to the conventional art. Accordingly, in one embodiment the GMODE signal may be applied only to the gate driving circuit 13 during the stabilization period and is not applied to the data driving circuit 12. In another embodiment, the GMODE signal can be input simultaneously to the gate driving circuit 13 and the data driving circuit 12 during the stabilization period.

In one embodiment, the power circuit 30 generates driving voltages Vcc, Vcom, Vpos, Vneg, VGH, and VGL using a DC-DC converter. The logic power voltage Vcc is a logic voltage necessary for driving an application specific integrated circuit (ASIC) of the controller 11, the source drive ICs of the data driving circuit 12, and the gate drive ICs of the gate driving circuit 13, and is, for example, a 3.3V DC voltage. The positive data voltage Vpos is, for example, a +15V DC voltage, and the negative voltage Vneg is, for example, a −15V DC voltage. The common voltage Vcom is, for example, a DC voltage between 0V and −2V. The gate high voltage VGH is approximately a +22V DC voltage. The gate low voltage VGL is approximately a −20V DC voltage.

Figure 3:
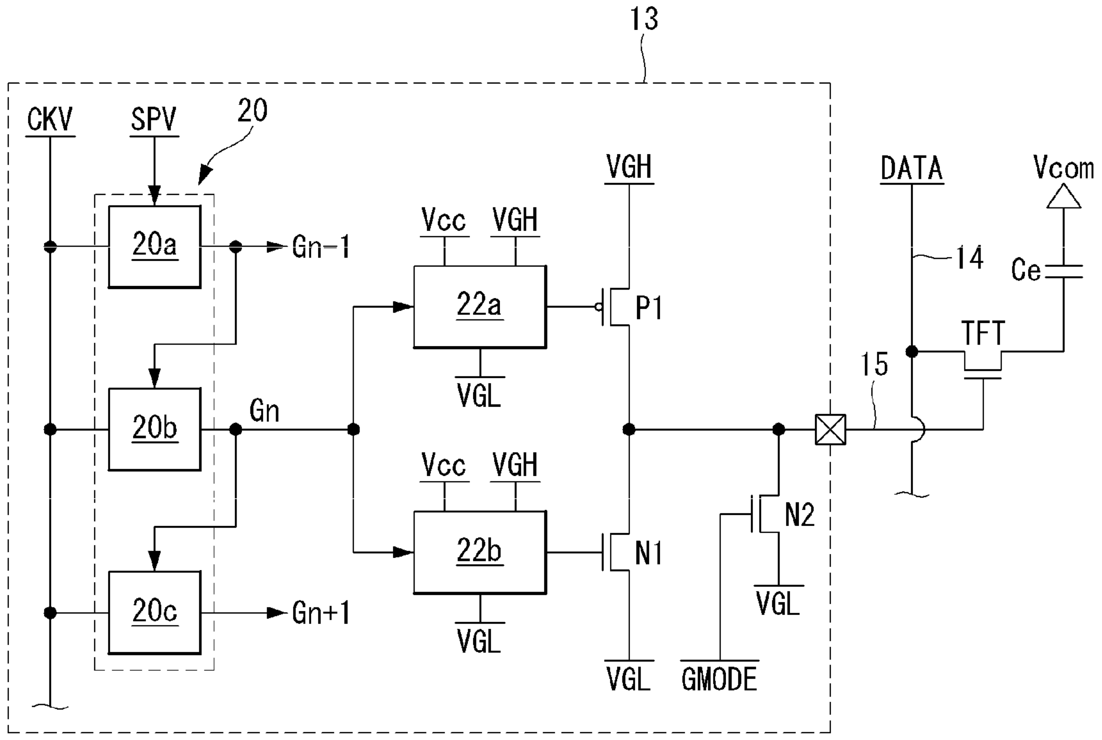
FIG. 3 illustrates a detailed view of the gate driving circuit according to one embodiment.
Figure 4:
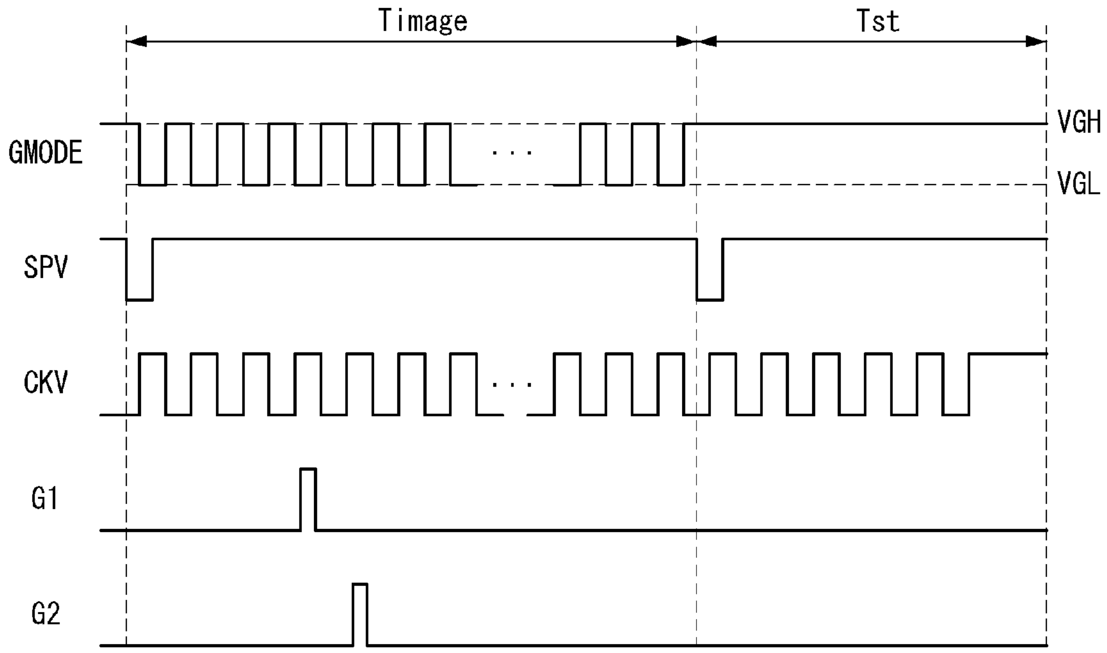
FIG. 4 illustrates waveforms of the gate driving circuit according to one embodiment.

FIG. 3 illustrates a detailed view of the gate driving circuit according to one embodiment. FIG. 4 illustrates waveforms of the gate driving circuit 13 according to one embodiment.

As shown in FIG. 3, the gate driving circuit 13 comprises a shift register 20, level shifter 22*a*, level shifter 22*b*, transistor P1, transistor N1, and transistor N2.

The shift register 20 comprises stages 20*a*, 20*b*, and 20*c* connected in a cascade configuration. A gate shift clock CKV is input to each of the stages 20*a* to 20*c*, and a gate start pulse SPV is input to the first stage 20*a*. The gate shift clock CKV comprises clock signals of two or more phases, whose phases are sequentially shifted. The stages 20*a* to 20*c* of the shift register 20 sequentially shifts the gate start pulse SPV by generating an output for each output of the gate shift clock CKV. The first stage 20*a* generates a first output $G_{n-1}$ whose phase is shifted from a start pulse in response to a first gate shift clock. The first output $G_{n-1}$ of first stage 20*a* is input to the second stage 20*b*. The second stage 20*b* receives the first output $G_{n-1}$ of the stage 20*a* as its start pulse. The second stage 20*b* generates a second output $G_n$ that is shifted from the first output $G_{n-1}$ in response to a second shift clock. The second output $G_n$ is input to the third stage 20*c* as its start pulse. The third stage 20*c* receives the second output $G_n$ of the second stage 20*b* as its start pulse and generates a third output $G_{n+1}$ that is shifted from the second output $G_n$ in response to a third gate shift clock.

The level shifter 22*a* and the level shifter 22*b* level-shifts the voltage of each output of the shift register 20. The level shifter 22*a* outputs a gate low voltage VGL when the output of the shift register 20 is a high logic voltage (e.g., 3.3V) and outputs a gate high voltage VGH when the output of the shift register 20 is a low logic voltage (e.g., 0 v). The second level shifter 22*b* outputs a gate high voltage VGH when the output of the shift register 20 is a low logic voltage (e.g., 0V) and outputs a gate low voltage VGL when the output of the shift register 20 is a high logic voltage (e.g., 3.3 v).

In one embodiment, the transistor P1 is implemented as a p-type MOSFET. As shown in FIG. 3, transistor P1 comprises a gate connected to an output terminal of the level shifter 22*a*, a source for supplying the gate high voltage VGH, and a drain connected to the output channel of the gate driving circuit 13. Transistor P1 is turned on when the output of level shifter 22*a* is the gate low voltage VGL thereby supplying the gate high voltage VGH to an output channel connected to the gate lines 15. Transistor P1 is turned off when the output of level shifter 22*a* is the gate high voltage VGH.

Transistor N1 and transistor N2 may be implemented as an n-type MOSFET. Transistor N1 comprises a gate connected to an output terminal of level shifter 22*b*, a source for supplying the gate low voltage VGL, and a drain connected to the output channel of the gate driving circuit 13. Transistor N1 is turned on when the output of level shifter 22*b* is the gate high voltage VGH thereby supplying the gate low voltage VGL to the output channel connected to the gate lines 13. Transistor N1 is turned off when the output of the level shifter 22*b* is the gate low voltage VGL.

Transistor N2 comprises a gate coupled to the GMODE signal, a source connected to the gate low voltage VGL, and a drain connected to the output channel of the gate driving circuit 13. In one embodiment, transistor N2 is a gate discharge transistor. Transistor N2 is turned on in response to the gate high voltage VGH of the GMODE signal. Transistor N2 connects the output channels of the gate driving circuit 13 to a low voltage source and forcibly discharges the output channels.

Referring now to FIGS. 4, G1 and G2 indicate scan pulses. The scan pulses sequentially output via a first output channel (e.g., gate line G1) and a second output channel (e.g., gate line G2) of the gate driving circuit 13. SPV signal represents the gate start pulse and the CKV signal represents the gate shift clock signal.

In FIG. 4, the image update period is referred to as "Timage" and the stabilization period is referred to as "Tst". The image update period Timage is approximately 600 msec in one embodiment, and the stabilization period Tst is approximately 200 msec in one embodiment. The image update period Timage and the stabilization period Tst may vary depending on the display panel characteristics or the operational characteristics of the driving circuits.

During the image update period Timage, the GMODE signal is generated as a pulse signal which is output at a gate low voltage VGL in synchronization with an output timing of scan (i.e., gate) pulses and output at a gate high voltage VGH when the scan pulses of the gate driving circuit 13 are not outputted. Accordingly, during the image update period Timage, transistor N2 is turned off at the output timing of the scan pulses, and turned on during a period in which no scan pulse is output from the gate driving circuit 13 to discharge the output channel of the gate driving circuit 13 with the low voltage source VGL. As a result, during the image update period Timage, transistor N2 controls the pulse width and falling time of the scan pulses supplied to the gate lines 15 and minimizes power consumption when no scan pulse is generated.

The GMODE signal maintains the gate high voltage VGH during the stabilization period Tst. Accordingly, during the stabilization period Tst, transistor N2 can cut off an abnormal output of the gate driving circuit 13 and minimize power consumption by continuously connecting the output channel of the gate driving circuit 14 to the low voltage source VGL to discharge the output channel.

Figure 5:
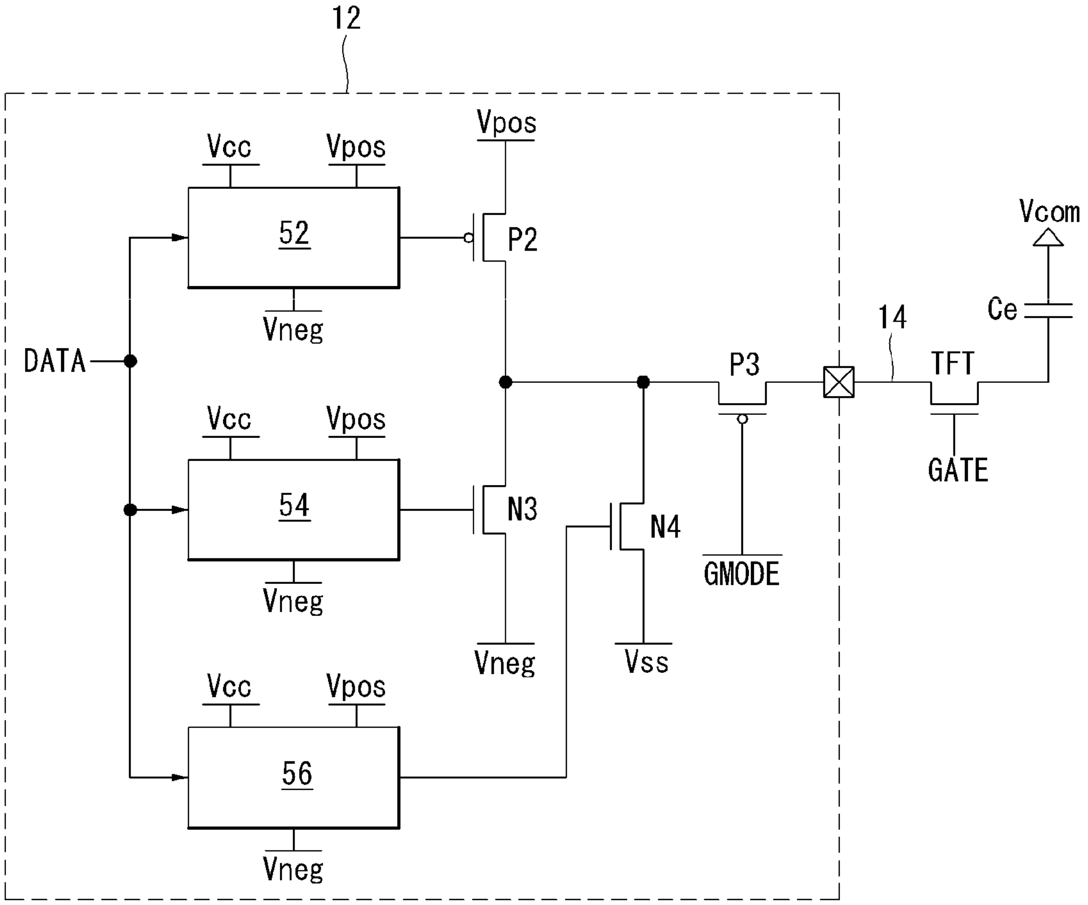
FIG. 5 illustrates a data driving circuit according to one embodiment.

FIG. 5 illustrates the data driving circuit 12 according to one embodiment. The data driving circuit 12 comprises level shifter 52, level shifter 54, level shifter 56, transistor P2, transistor P3, transistor N3, and transistor N4.

The level shifter 52 outputs a negative voltage Vneg when digital data input from the controller 11 is the first value (e.g., '012') during the duration of image update period. Level shifter 54 outputs a positive voltage Vpos when digital data input from the controller 11 is the second value (e.g., '102') during the duration of image update period. Level shifter 56 outputs a positive voltage Vpos when digital data input from the controller 11 is the third value (e.g., '002') or a fourth value (e.g., '112') during the duration of image update period.

In one embodiment, transistor P2 and transistor P3 are implemented as a p-type MOSFET. Transistor N3 and transistor N4 are implemented as an n-type MOSFET in one embodiment.

Transistor P2 supplies a positive data voltage Vpos to a data output channel connected to the data lines 14 in response to a negative voltage output Vneg from the first level shifter 52. Transistor P2 comprises a gate connected to an output terminal of level shifter 52, a source connected to a positive data voltage source Vpos, and a drain connected to a data output channel of the data driving circuit 12.

Transistor N3 supplies a negative data voltage Vneg to the output channel connected to the data lines 14 in response to a positive voltage output Vpos from level shifter 54. Transistor N3 comprises a gate connected to an output terminal of level shifter 54, a source connected to a negative data voltage source Vss, and a drain connected to the output channel of the data driving circuit 12.

Transistor N4 supplies a ground voltage Vss of 0V to the data output channel connected to the data lines 14 in response to a positive voltage Vpos output from level shifter 56. Transistor N4 comprises a gate connected to an output terminal of level shifter 56, a source connected to a ground voltage source Vss, and a drain connected to the data output channel of the data driving circuit 12.

In one embodiment, transistor P3 is a floating source transistor. Transistor P3 is turned on in response to the gate low voltage VGL of the GMODE signal shown in FIG. 4 to connect the data output channel of the data driving circuit 12 and the data lines 14 when a data voltage is output from the data driving circuit 12. Transistor P3 forms a current path between the output channel and the data lines 14 during an image update period Timage. Transistor P3 comprises a gate coupled to the GMODE signal, a source connected to the data output channel of the data driving circuit 12, and a drain connected to the data lines 14.

Referring back to FIG. 4, during the image update period Timage, the GMODE signal is generated as a pulse signal which is output at a gate low voltage VGL in synchronization with an output timing of scan pulses and output at a gate high voltage VGH when the scan pulses are not output during the stabilization period Tst. Accordingly, during the image update period Timage, transistor P3 adjusts the output timing of data voltages and minimizes power consumption of the data driving circuit 12 by making the output channel of the data driving circuit 12 in a period during which no data voltage is output.

The GMODE signal maintains the gate high voltage VGH during the stabilization period Tst. Accordingly, during the stabilization period Tst, transistor P3 maintains the off state and makes the output channel of the data driving circuit 12 float to block the current path between the output channel and the data lines 14. As a result, during the stabilization period Tst, transistor P3 is able to cut off an abnormal output of the data driving circuit 12 and minimize power consumption.

As discussed above, the embodiments herein allow the output channel of the gate driving circuit 13 to be connected to the low voltage source to forcibly discharge the output channel during the stabilization period set subsequent to the image update period. As a result, the display device can minimize power consumption by cutting off an output of the gate driving circuit even if a signal is input to the gate driving circuit during the stabilization period. Moreover, the display device can prevent unwanted outputs from being generated from the gate driving circuit 13 during the stabilization period.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electrophoresis display device comprising:

a display panel including data lines and gate lines that intersect the data lines;

a data driving circuit including a data output channel, the data driving circuit converting digital data into data voltages that are outputted to the data lines via the data output channel during an image update period;

a gate driving circuit comprising an output channel, the gate driving circuit outputting gate signals to the gate lines via the output channel during the image update period; and a gate discharge transistor connected to the output channel of the gate driving circuit and an intersection of a gate line and a data line, the gate discharge transistor providing a pathway that continuously discharges the output channel of the gate driving circuit during a stabilization period subsequent the image update period in response to a power consumption shutoff control signal, wherein the gate driving circuit outputs a gate signal that alternates between a first gate level and a second gate level that is greater than the first gate level during the image update period, wherein during the image update period the power consumption shutoff control signal is output at a first signal level responsive to the second gate level of any gate signal and output at a second signal level different from the first signal level of the power consumption shutoff control signal responsive to a transition to the first gate level of any gate signal, and wherein the gate discharge transistor provides a pathway to discharge the output channel of the gate driving circuit during the image update period responsive to the second signal level of the power consumption shutoff control signal during the image update period, and the gate signal is output to the gate line via the output channel during the image update period responsive to the first signal level of the power consumption shutoff control signal during the image update period.

2. The electrophoresis display device of claim 1, further comprising:

a controller that transmits the digital data to the data driving circuit and transmits the power consumption shutoff control signal to the gate driving circuit and the data driving circuit.

3. The electrophoresis display device of claim 2, wherein the controller supplies the digital data for each data grayscale to the data driving circuit according to a current grayscale status of the pixels and a next status of pixels to be updated using a lookup table having waveforms of the data voltages set therein and a frame memory storing input images.

4. The electrophoresis display device of claim 3, wherein the controller generates the power consumption shutoff control signal during the stabilization period that follows the image update period to stop outputs of the gate driving circuit and to stop outputs of the data driving circuit in order to minimize power consumption.

5. The electrophoresis display device of claim 4, wherein the gate driving circuit connects the output channel connected to the gate lines to a ground voltage source or a low voltage source generating the low gate voltage in response to the power consumption shutoff control signal received from the controller in order to discharge the output channel during the stabilization period.

6. The electrophoresis display device of claim 1, further comprising a source floating transistor that periodically connects output channels of the data driving circuit to the data lines during the image update period in response to the power consumption shutoff control signal and makes the output channels of the data driving circuits continuously float during the stabilization period in response to the power consumption shutoff control signal.

7. The electrophoresis display device of claim 6, wherein the source floating transistor is incorporated in the data driving circuit.

8. The electrophoresis display device of claim 1, further comprising:

a floating source transistor that continuously disconnects the data output channel of the data driving circuit during the stabilization period in response to the power consumption shutoff control signal.

9. The electrophoresis display device of claim 8, wherein the floating source transistor periodically disconnects the data output channel of the data driving circuit during the image update period in response to the power consumption shutoff control signal.

10. The electrophoresis display device of claim 1, wherein the power consumption shutoff control signal is continuously output at the second level during the stabilization period.

11. The electrophoresis display device of claim 1, wherein the gate discharge transistor is incorporated in the gate driving circuit.

12. A method for controlling an electrophoresis display device, the method comprising:

receiving a power consumption shutoff control signal during an image update period and during a stabilization period subsequent the image update period;

continuously discharging an output channel of a gate driving circuit during the stabilization period in response to the power consumption shutoff control signal, during the image update period the gate driving circuit outputting a gate signal that alternates between a first gate level and a second gate level that is greater than the first gate level, during the image update period the power consumption shutoff control signal being at a first signal level responsive to the second gate level of any gate signal and being at a second signal level different from the first signal level of the power consumption shutoff control signal responsive to a transition to the first gate level of any gate signal; and discharging the output channel of the gate driving circuit during the image update period responsive to the second signal level of the power consumption shutoff control signal during the image update period, and outputting the gate signal to a gate line via the output channel during the image update period responsive to the first signal level of the power consumption shutoff control signal during the image update period.

13. The method of claim 12, further comprising:

periodically connecting the output channel of a data driving circuit to data lines of the electrophoresis display device during the image update period in response to the power consumption shutoff control signal.

14. The method of claim 13, further comprising:

continuously disconnecting the output channel of the data driving circuit during the stabilization period in response to the power consumption shutoff control signal.

15. The method of claim 12, wherein the power consumption shutoff control signal is continuously maintained at the second level during the stabilization period.

16. The method of claim 15, further comprising:

supplying a digital data for each data grayscale to a data driving circuit according to a current grayscale status of the pixels and a next status of pixels to be updated using a lookup table having waveforms of data voltages set therein and a frame memory storing input images.

17. The method of claim 16, further comprising:

generating the power consumption shutoff control signal during the stabilization period that follows the image update period to stop outputs of the gate driving circuit and to stop outputs of the data driving circuit in order to minimize power consumption.

* * * * *